(No Model.) 2 Sheets—Sheet 1.
S. PULSON & M. L. SNOW.
BUSHING FOR EMERY WHEELS AND SIMILAR ARTICLES.
No. 308,854. Patented Dec. 2, 1884.
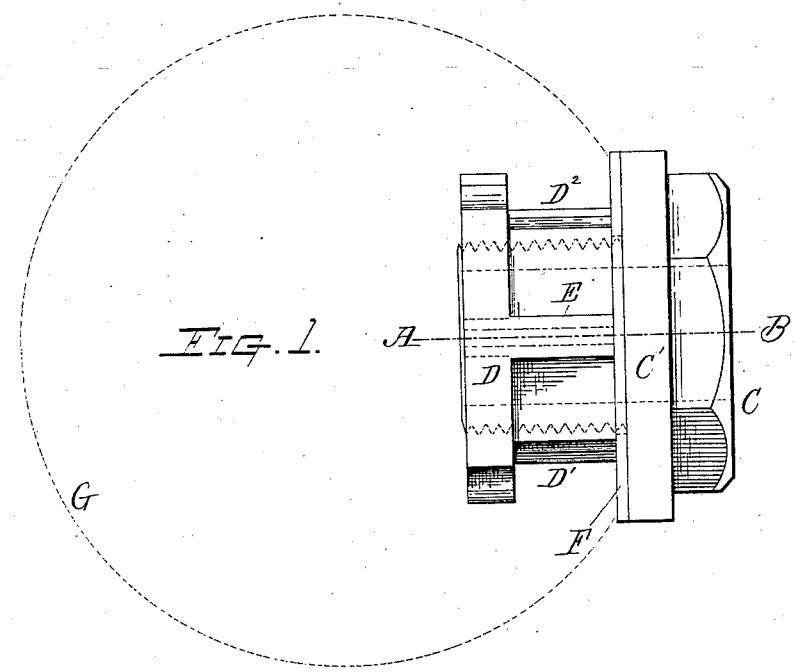
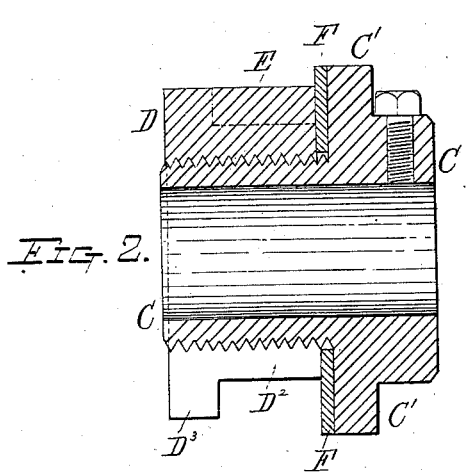
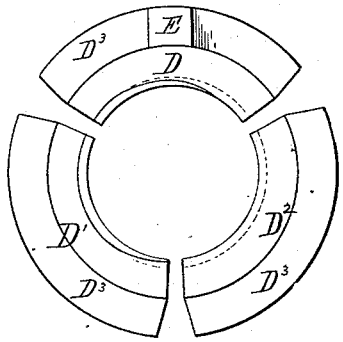
Witnesses:
Albert N. Barker.
C. H. Arnold
Inventors:
Sven Pulson,
Marcus L. Snow.
By J. G. Arnold
Attorney.

(No Model.) 2 Sheets—Sheet 2.

S. PULSON & M. L. SNOW.
BUSHING FOR EMERY WHEELS AND SIMILAR ARTICLES.

No. 308,854. Patented Dec. 2, 1884.

ATTEST-
Albert A. Barker
C. H. Arnold.

INVENTORS
Swen Pulson
Marcus L. Snow
By J. G. Arnold
Att'y.

UNITED STATES PATENT OFFICE.

SWEN PULSON AND MARCUS L. SNOW, OF STERLING, MASSACHUSETTS.

BUSHING FOR EMERY-WHEELS AND SIMILAR ARTICLES.

SPECIFICATION forming part of Letters Patent No. 308,854, dated December 2, 1884.

Application filed May 15, 1884. (No model.)

*To all whom it may concern:*

Be it known that we, SWEN PULSON and MARCUS L. SNOW, residents of Sterling, in the county of Worcester, State of Massachusetts, have invented a new Improved Bushing for Emery-Wheels and similar Articles, of which the following is a specification.

Our invention relates to bushings used for holding the wheel to the arbor or driving-shaft securely, being specially adapted to solid wheels. Its nature is fully shown by the following description and accompanying drawings of a bushing embodying our invention.

Figure 5:
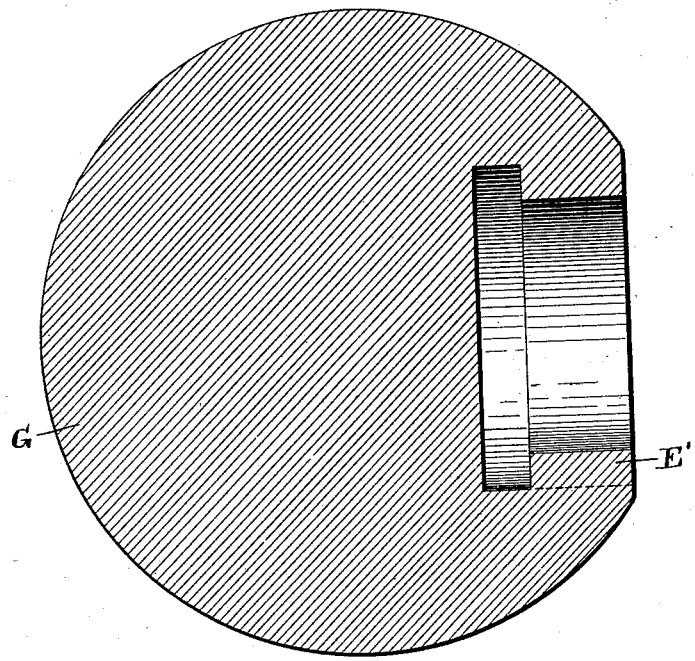
Figure 4:
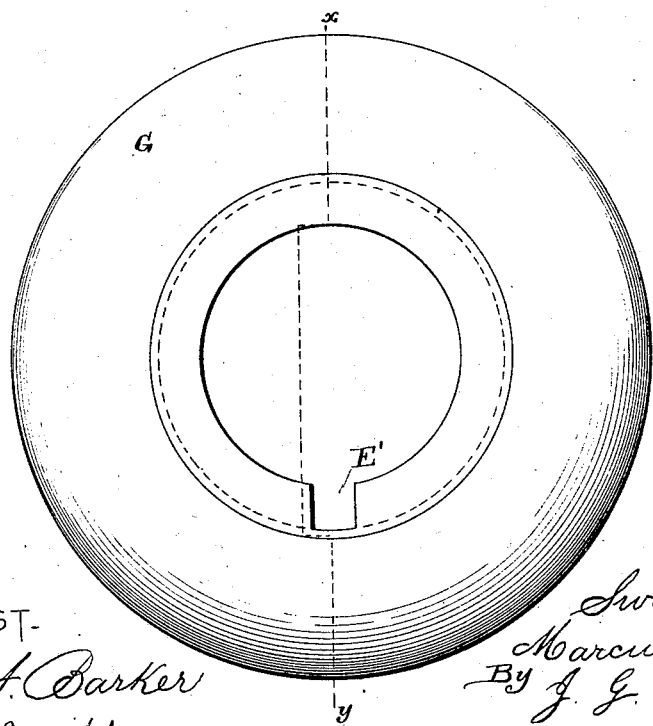

In said drawings, Figure 1 is a side view of the bushing with all parts in place, the broken lines showing the wheel or grinder. Fig. 2 is a cross-section on the line A B of Fig. 1, as seen from below. Fig. 3 is an end view of the sectional parts as seen from the right of Fig. 1, with the solid nut C removed. Figs. 4 and 5 show a view of the wheel G and its opening, and a section of the same on line $x$ $y$ of Fig. 4.

D D' D² are three parts of a cylindrical bushing, having a screw-thread on their inner surfaces, into which the solid nut C is fitted, and each part provided with a curved lip or flange, D³, fitting a straight groove, E', or space in the wheel G, and one or more of the sections D, having a longitudinal rib, E, fitting a similar groove in the wheel. In cutting these sections the corners of their flanges D³ may be rounded, as shown, to facilitate their free passage through the opening fitting their body part D D' D².

C is a solid nut screwing into the sections D D' D², causing them to fill the space made for them in the wheel, and, having a slightly-yielding collar, F, is screwed up tight, the rib E making it impossible for the bushing to turn in the wheel, the nut C being fitted to the arbor in any of the common ways.

Having thus fully described our invention, what we claim is—

The removable bushing described, consisting of the sectional parts, each having a partially-circular flange, and one or more of them provided with a rib longitudinally, in combination with a solid nut screwing into these parts, and a wheel or similar article having a hole fitted for said parts and their projecting flanges and rib, substantially as described.

SWEN PULSON.
MARCUS L. SNOW.

Witnesses:
C. H. ARNOLD,
J. G. ARNOLD.